US008872823B2

(12) United States Patent
Gould et al.

(10) Patent No.: US 8,872,823 B2
(45) Date of Patent: *Oct. 28, 2014

(54) AUTOMATIC REAL-TIME SHADER MODIFICATION FOR TEXTURE FETCH INSTRUMENTATION

(75) Inventors: Jason Matthew Gould, Woodinville, WA (US); Michael Edward Pietraszak, Woodinville, WA (US); Zsolt Mathe, Issaquah, WA (US); J. Andrew Goossen, Issaquah, WA (US); Casey Leon Meekhof, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 975 days.

This patent is subject to a terminal disclaimer.

(21) Appl. No.: 12/576,548

(22) Filed: Oct. 9, 2009

(65) Prior Publication Data

US 2011/0084964 A1   Apr. 14, 2011

(51) Int. Cl.
| | |
|---|---|
| G06T 15/50 | (2011.01) |
| G09G 5/00 | (2006.01) |
| G06F 15/167 | (2006.01) |
| G06T 15/04 | (2011.01) |
| G06T 15/00 | (2011.01) |

(52) U.S. Cl.
CPC .............. G06T 15/005 (2013.01); G06T 15/50 (2013.01); G06T 15/04 (2013.01)
USPC ............................ 345/426; 345/582; 345/541

(58) Field of Classification Search
USPC .......................................... 345/582, 426, 541
See application file for complete search history.

(56) References Cited

U.S. PATENT DOCUMENTS

| | | | |
|---|---|---|---|
| 4,617,682 A | 10/1986 | Mori et al. | |
| 5,880,737 A | 3/1999 | Griffin et al. | |
| 6,236,405 B1 * | 5/2001 | Schilling et al. | 345/582 |
| 6,373,482 B1 | 4/2002 | Migdel et al. | |
| 6,426,753 B1 * | 7/2002 | Migdal | 345/506 |
| 6,724,394 B1 * | 4/2004 | Zatz et al. | 345/581 |
| 6,947,047 B1 * | 9/2005 | Moy et al. | 345/501 |
| 6,972,769 B1 * | 12/2005 | Nebeker et al. | 345/552 |
| 6,993,185 B2 | 1/2006 | Guo et al. | |
| 7,091,979 B1 * | 8/2006 | Donovan | 345/530 |
| 7,154,507 B1 * | 12/2006 | Moreton et al. | 345/582 |
| 7,170,526 B1 | 1/2007 | Johnson | |
| 7,176,917 B1 | 2/2007 | Morgan et al. | |
| 7,184,052 B2 | 2/2007 | Wang et al. | |
| 7,339,590 B1 | 3/2008 | Moskal et al. | |

(Continued)

OTHER PUBLICATIONS

PCT Application No. PCT/US2010/051959 : International Search Report and Written Opinion of the International Searching Authority, Jun. 3, 2011, 11 pages.

(Continued)

*Primary Examiner* — Kee M Tung
*Assistant Examiner* — Nicholas R Wilson
(74) *Attorney, Agent, or Firm* — Micah Goldsmith; Judy Yee; Micky Minhas

(57) ABSTRACT

A method and system are disclosed for automatic instrumentation that modifies a video game's shaders at run-time to collect detailed statistics about texture fetches such as MIP usage. The tracking may be transparent to the game application and therefore not require modifications to the application. In an embodiment, the method may be implemented in a software development kit used to record and provide texture usage data and optionally generate a report.

20 Claims, 9 Drawing Sheets

(56) References Cited

U.S. PATENT DOCUMENTS

| | | | |
|---|---|---|---|
| 7,385,611 B1* | 6/2008 | Toksvig et al. | 345/582 |
| 7,404,059 B1 | 7/2008 | Nordquist | |
| 7,466,318 B1* | 12/2008 | Kilgard | 345/582 |
| 7,483,035 B2 | 1/2009 | Xu | |
| 7,528,843 B1* | 5/2009 | Kilgard et al. | 345/582 |
| 7,542,043 B1* | 6/2009 | Lindholm et al. | 345/506 |
| 7,561,165 B2 | 7/2009 | Strassenburg-Kleciak et al. | |
| 7,567,252 B2 | 7/2009 | Buck et al. | |
| 7,605,822 B1* | 10/2009 | Kugler | 345/582 |
| 7,830,386 B1* | 11/2010 | Hahn | 345/501 |
| 7,859,548 B1* | 12/2010 | Lindholm | 345/582 |
| 7,886,116 B1* | 2/2011 | Everitt | 711/154 |
| 2003/0018694 A1 | 1/2003 | Chen et al. | |
| 2003/0126490 A1 | 7/2003 | Litt et al. | |
| 2004/0012597 A1* | 1/2004 | Zatz et al. | 345/501 |
| 2004/0046765 A1* | 3/2004 | Lefebvre et al. | 345/582 |
| 2004/0148318 A1 | 7/2004 | Taylor et al. | |
| 2005/0140672 A1 | 6/2005 | Hubbell | |
| 2005/0182911 A1* | 8/2005 | Kaiser | 711/170 |
| 2005/0228829 A1* | 10/2005 | Richards et al. | 707/104.1 |
| 2005/0259108 A1* | 11/2005 | Chladny | 345/588 |
| 2006/0119607 A1* | 6/2006 | Lindholm et al. | 345/552 |
| 2007/0127814 A1* | 6/2007 | Fluck et al. | 382/171 |
| 2007/0171234 A1* | 7/2007 | Crawfis et al. | 345/587 |
| 2007/0182753 A1* | 8/2007 | Isidoro et al. | 345/587 |
| 2007/0200864 A1* | 8/2007 | Tucker | 345/582 |
| 2008/0001952 A1* | 1/2008 | Srinivasan et al. | 345/502 |
| 2008/0001956 A1* | 1/2008 | Markovic et al. | 345/522 |
| 2008/0049031 A1* | 2/2008 | Liao et al. | 345/530 |
| 2008/0192063 A1* | 8/2008 | Liao et al. | 345/582 |
| 2008/0263103 A1 | 10/2008 | McGregor et al. | |
| 2008/0266287 A1 | 10/2008 | Ramey et al. | |
| 2009/0021513 A1* | 1/2009 | Joshi et al. | 345/419 |
| 2009/0033660 A1* | 2/2009 | Levene et al. | 345/424 |
| 2009/0054140 A1* | 2/2009 | Beser et al. | 463/31 |
| 2009/0066714 A1 | 3/2009 | Liao et al. | |
| 2009/0113251 A1 | 4/2009 | Goossen et al. | |
| 2009/0122062 A1* | 5/2009 | Kilpatrick | 345/426 |
| 2009/0128575 A1 | 5/2009 | Liao et al. | |
| 2009/0147017 A1* | 6/2009 | Jiao | 345/582 |
| 2009/0267956 A1* | 10/2009 | Greaves et al. | 345/555 |
| 2010/0141666 A1* | 6/2010 | Christopher et al. | 345/520 |
| 2010/0329564 A1* | 12/2010 | Hervas et al. | 382/190 |
| 2010/0332560 A1* | 12/2010 | Gerbasi, III | 707/812 |
| 2011/0032257 A1* | 2/2011 | Peterson et al. | 345/420 |
| 2011/0063318 A1* | 3/2011 | Bolz et al. | 345/552 |
| 2011/0252204 A1* | 10/2011 | Coon et al. | 711/150 |
| 2011/0264709 A1* | 10/2011 | Beardsmore et al. | 707/804 |

OTHER PUBLICATIONS

Real-Time Shader Programming, "Shaders and the Existing Graphics Pipeline," Dec. 13, 2007, 51 pages, downloaded from http://realtimeprograme.blogspot.com/.

NVIDIA, "NVIDIA PerfHUD 5.1 User Guide," Nov. 2007, 77 pages, downloaded from http://developer.download.nvidia.com/tools/NVPerfHUD/5beta4/UserGuide.pdf.

Cleary, K.R., Ph.D., "Periscopic Spine Surgery," Georgetown University, Annual Report, Dec. 21, 2005—Dec. 20, 2006, 117 pages, downloaded from http://www.dtic.mil/cgi-bin/GetTRDoc?AD=ADA469259&Location=U2&doc=GetTRDoc.pdf.

Diplomarbeit, "Designing a Modern Rendering Engine," downloaded Aug. 18, 2009, 168 pages, downloaded from http://www.yare.at/yare2/yare.pdf.

PCT Application No. PCT/US2010/051967: International Search Report and Written Opinion of the International Searching Authority, May 31, 2011, 8 pages.

Bauer, M., "Application Development for Touch-Screen Interfaces," Bachelor's Thesis, Lulea University of Technology, May, 2007, 1-20 downloaded from http://natural-ui.com/downioads/whitepapers/Application Developement.pdf.

Doherty, E., "2D in Direct3D Using Textured Quads," Jul. 31, 2003, 21 pages, downloaded from http://www.gamedev/net/reference/articles/article1972.asp.

Renninger, L.W. et al., "When is scene identification just texture recognition?" *Vision Research*, 2004, 44, 2301-2311.

Riguer, G. "Performance Optimization Techniques for ATI Graphics Hardware with DirectX® 9.0," ATI Technologies, Inc., Revision 1.0, Dec. 1-31, 2002; downloaded from http://ati.amd.com/developer/dx9/ATI-DX9 Optimization.pdf.

SGI, "OpenGL Shader ISL Library Reference Page Index," 94 pages, downloaded from http://techpubs.sgi.com/library/manuals/4000/007-4648-001/pdf/007-4648-001.pdf.

Smith, C., "A Singleton Texture Manager for OpenGL," Jul. 18, 2001, 3 pages, downloaded from http://www.gamedev.net/reference/articles/article1439.asp.

* cited by examiner

AUTOMATIC REAL-TIME SHADER MODIFICATION FOR TEXTURE FETCH INSTRUMENTATION

CROSS-REFERENCE

This application is related to co-pending U.S. application Ser. No. 12/576,689, filed on Oct. 9, 2009, entitled "AUTOMATIC RUN-TIME IDENTIFICATION OF TEXTURES," which is hereby incorporated by reference in its entirety.

BACKGROUND

Many computing applications perform a significant amount of processing to generate graphics. For example, video game applications may use 3D graphics to render images and animations. However, 3D applications typically require a significant amount of texture data to produce good quality scenes. The amount of texture data in turn requires a significant amount of space in memory and on the storage medium (e.g., hard disk or optical disc). For most games, this texture data, as a percentage, typically consumes most of the available storage, relative to other aspects of the game such as the executable program code and audio data. Therefore, reducing the amount of graphics data such as texture data and optimizing the processing required to support the application is desirable for increasing the space available for other types of data, reducing download times, and fitting necessary data such as texture data onto a storage medium such as an optical disc. Reducing the amount of graphics data used for textures in a game or program would also allow for new textures used in new levels or new areas new or portions of the game to be added, expanding the game or program.

SUMMARY

An important aspect of data optimization is understanding how many times an image file is used during the course of the execution of an application. For example, it would be advantageous to know how many times a certain MIP level of a texture is used during the course of a video game. In many cases an application such as a video game may ship with many examples of sub-optimal texture usage such as duplicate textures, textures that are never used, and MIP levels that never fetched.

However, gathering detailed statistics regarding texture usage requires a significant amount of development investment and game modification. Typically, developers use simpler techniques such as visual inspection where textures are colored at run-time based on which MIP level is being displayed. Such techniques may, for example, provide information for identifying issues with the diffuse texture on a mesh. However, such techniques may not provide sufficient information in the case of textures where the color does not come through such as in a normal or gloss map. Furthermore, the use of visual inspection does not provide a holistic view of a texture's usage throughout the game, and tend to provide more qualitative rather than quantitative analysis. This visual inspection method is also not able to detect identical duplicates because visually they appear the same upon visual observation, and may not provide an easy mechanism for identifying which textures are being observed.

It is therefore desirable to uniquely identify textures as they are loaded and passed to the host system via, for example, the application programming interface (API). Typically such identification is difficult to perform on platforms that provide the application flexibility for creating and manipulating textures. For example, the system would need to deal with textures that have been deleted, relocated, aliased, and the like. In addition, the system must be able to detect if a texture being loaded has been used before.

In various embodiments disclosed herein, a method and system are disclosed for run-time tracking and monitoring of detailed statistics about the use of data assets during execution of an application such as a video game. After execution of the game, usage data may be provided to the developer describing the use of each asset during execution.

In one embodiment, a method and system are disclosed for automatic instrumentation that modifies a video game's shaders at run-time to collect detailed statistics about texture fetches. In an embodiment, the method may be performed inside the 3D API library and the shaders modified on-the-fly as the textures and graphics commands are passed in. The tracking is transparent to the game application and therefore not require modifications to the application.

In an embodiment, such a method may be implemented in a software development kit, and a game application developer may use a texture tracking feature to record and provide texture usage data. The development kit may then automatically instrument shaders as the data and instructions are passed to the system in real time.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The systems, methods, and computer readable media for altering a view perspective within a virtual environment in accordance with this specification are further described with reference to the accompanying drawings in which.

DETAILED DESCRIPTION OF ILLUSTRATIVE EMBODIMENTS

Certain specific details are set forth in the following description and figures to provide a thorough understanding of various embodiments of the disclosure. Certain well-known details often associated with computing and software technology are not set forth in the following disclosure to avoid unnecessarily obscuring the various embodiments of the disclosure. Further, those of ordinary skill in the relevant art will understand that they can practice other embodiments of the disclosure without one or more of the details described below. Finally, while various methods are described with reference to steps and sequences in the following disclosure, the description as such is for providing a clear implementation of embodiments of the disclosure, and the steps and sequences of steps should not be taken as required to practice this disclosure.

Infrastructure for Texture Identification and Tracking

Figure 1:
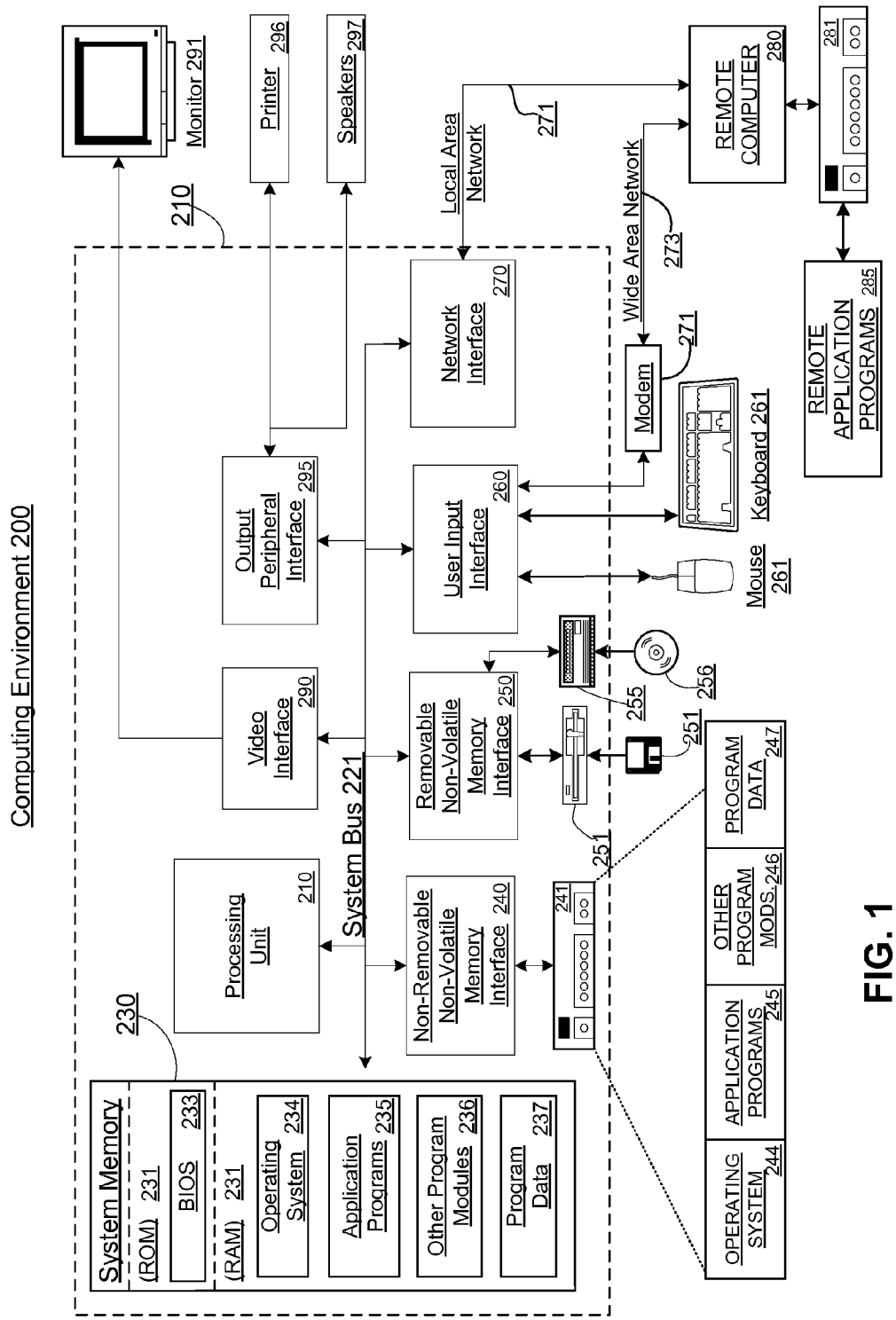
FIG. 1 is a block diagram of an example computing environment.

FIG. 1 shows an exemplary computing environment in which example embodiments and aspects may be implemented. The computing system environment 200 is only one example of a suitable computing environment and is not intended to suggest any limitation as to the scope of use or functionality. Neither should the computing environment 200 be interpreted as having any dependency or requirement relating to any one or combination of components illustrated in the exemplary operating environment 200.

Numerous other general purpose or special purpose computing system environments or configurations may be used. Examples of well known computing systems, environments, and/or configurations that may be suitable for use include, but are not limited to, personal computers, server computers, hand-held or laptop devices, multiprocessor systems, microprocessor-based systems, set top boxes, programmable consumer electronics, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 1, an exemplary system includes a general purpose computing device in the form of a computer 210. Components of computer 210 may include, but are not limited to, a processing unit 210, a system memory 230, and a system bus 221 that couples various system components including the system memory to the processing unit 210. The processing unit 210 may represent multiple logical processing units such as those supported on a multi-threaded processor. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus). The system bus 221 may also be implemented as a point-to-point connection, switching fabric, or the like, among the communicating devices.

Computer 210 typically includes a variety of computer readable media. Computer readable media can be any available media that can be accessed by computer 210 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 210. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

Figure 2:
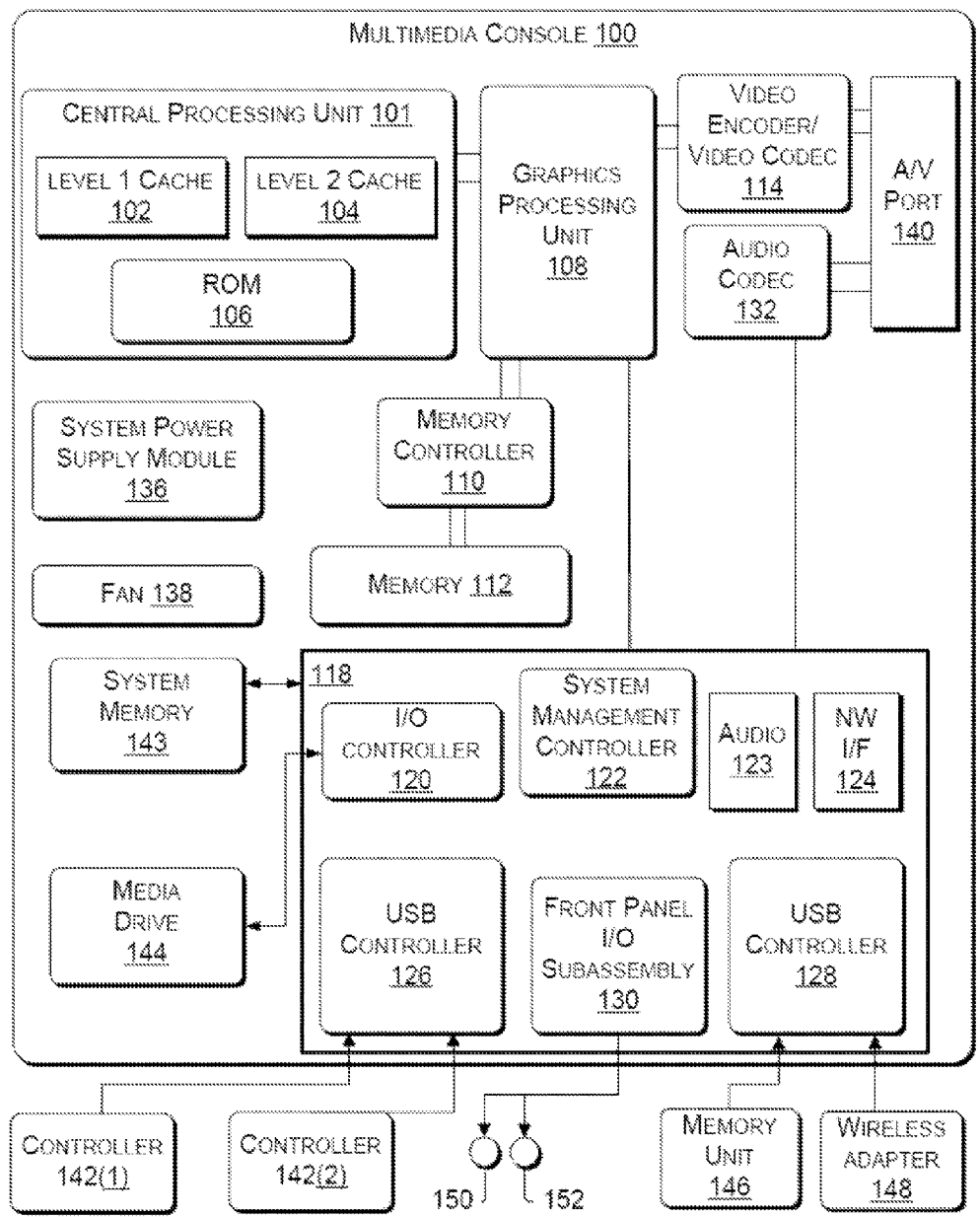
FIG. 2 illustrates another example embodiment of a computing environment in which aspects of the methods and systems described herein may be embodied.

The system memory 230 includes computer storage media in the form of volatile and/or nonvolatile memory such as read only memory (ROM) 231 and random access memory (RAM) 231. A basic input/output system 233 (BIOS), containing the basic routines that help to transfer information between elements within computer 210, such as during start-up, is typically stored in ROM 231. RAM 231 typically contains data and/or program modules that are immediately accessible to and/or presently being operated on by processing unit 210. By way of example, and not limitation, FIG. 2 illustrates operating system 234, application programs 235, other program modules 236, and program data 237.

The computer 210 may also include other removable/non-removable, volatile/nonvolatile computer storage media. By way of example only, FIG. 1 illustrates a hard disk drive 240 that reads from or writes to non-removable, nonvolatile magnetic media, a magnetic disk drive 251 that reads from or writes to a removable, nonvolatile magnetic disk 251, and an optical disk drive 255 that reads from or writes to a removable, nonvolatile optical disk 256, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 241 is typically connected to the system bus 221 through a non-removable memory interface such as interface 240, and magnetic disk drive 251 and optical disk drive 255 are typically connected to the system bus 221 by a removable memory interface, such as interface 250.

The drives and their associated computer storage media discussed above and illustrated in FIG. 1, provide storage of computer readable instructions, data structures, program modules and other data for the computer 210. In FIG. 1, for example, hard disk drive 241 is illustrated as storing operating system 244, application programs 245, other program modules 246, and program data 247. Note that these components can either be the same as or different from operating system 234, application programs 235, other program modules 236, and program data 237. Operating system 244, application programs 245, other program modules 246, and program data 247 are given different numbers here to illustrate that, at a minimum, they are different copies. A user may enter commands and information into the computer 20 through input devices such as a keyboard 261 and pointing device 261, commonly referred to as a mouse, trackball or touch pad. Other input devices (not shown) may include a microphone, joystick, game pad, satellite dish, scanner, or the like. These and other input devices are often connected to the processing unit 210 through a user input interface 260 that is coupled to the system bus, but may be connected by other interface and bus structures, such as a parallel port, game port or a universal serial bus (USB). A monitor 291 or other type of display device is also connected to the system bus 221 via an interface, such as a video interface 290. In addition to the monitor, computers may also include other peripheral output devices such as speakers 297 and printer 296, which may be connected through an output peripheral interface 295.

The computer 210 may operate in a networked environment using logical connections to one or more remote computers, such as a remote computer 280. The remote computer 280 may be a personal computer, a server, a router, a network PC, a peer device or other common network node, and typically includes many or all of the elements described above relative to the computer 210, although only a memory storage device 281 has been illustrated in FIG. 1. The logical connections depicted in FIG. 1 include a local area network (LAN) 271 and a wide area network (WAN) 273, but may also include other networks. Such networking environments are commonplace in offices, enterprise-wide computer networks, intranets and the Internet.

When used in a LAN networking environment, the computer 210 is connected to the LAN 271 through a network interface or adapter 270. When used in a WAN networking environment, the computer 210 typically includes a modem 271 or other means for establishing communications over the WAN 273, such as the Internet. The modem 271, which may be internal or external, may be connected to the system bus 221 via the user input interface 260, or other appropriate mechanism. In a networked environment, program modules depicted relative to the computer 210, or portions thereof, may be stored in the remote memory storage device. By way of example, and not limitation, FIG. 1 illustrates remote application programs 285 as residing on memory device 281. It will be appreciated that the network connections shown are exemplary and other means of establishing a communications link between the computers may be used.

FIG. 2 illustrates an example embodiment of a computing environment that may be used in accordance with the disclosed subject matter. The computing environment such as the computing environment 12 described above with respect to FIG. 1 may be a multimedia console 100, such as a gaming console. As shown in FIG. 2, the multimedia console 100 has a central processing unit (CPU) 101 having a level 1 cache 102, a level 2 cache 104, and a flash ROM (Read Only Memory) 106. The level 1 cache 102 and a level 2 cache 104 temporarily store data and hence reduce the number of memory access cycles, thereby improving processing speed and throughput. The CPU 101 may be provided having more than one core, and thus, additional level 1 and level 2 caches 102 and 104. The flash ROM 106 may store executable code that is loaded during an initial phase of a boot process when the multimedia console 100 is powered ON.

A graphics processing unit (GPU) 108 and a video encoder/video codec (coder/decoder) 114 form a video processing pipeline for high speed and high resolution graphics processing. Data is carried from the graphics processing unit 108 to the video encoder/video codec 114 via a bus. The video processing pipeline outputs data to an A/V (audio/video) port 140 for transmission to a television or other display. A memory controller 110 is connected to the GPU 108 to facilitate processor access to various types of memory 112, such as, but not limited to, a RAM (Random Access Memory).

The multimedia console 100 includes an I/O controller 120, a system management controller 122, an audio processing unit 123, a network interface controller 124, a first USB host controller 126, a second USB controller 128 and a front panel I/O subassembly 130 that are preferably implemented on a module 118. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface 124 and/or wireless adapter 148 provide access to a network (e.g., the Internet, home network, etc.) and may be any of a wide variety of various wired or wireless adapter components including an Ethernet card, a modem, a Bluetooth module, a cable modem, and the like.

System memory 143 is provided to store application data that is loaded during the boot process. A media drive 144 is provided and may comprise a DVD/CD drive, hard drive, or other removable media drive, etc. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection (e.g., IEEE 1394).

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 132 via a communication link. The audio processing pipeline outputs data to the A/V port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 100 is powered ON, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by simply connecting the system to a television or other display. In this standalone mode, the multimedia console 100 allows one or more users to interact with the system, watch movies, or listen to music. However, with the integration of broadband connectivity made available through the network interface 124 or the wireless adapter 148, the multimedia console 100 may further be operated as a participant in a larger network community.

When the multimedia console 100 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., popups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resynch is eliminated.

After the multimedia console 100 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 101 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 142(1) and 142(2)) are shared by gaming applications and system applications. The input devices are not reserved resources, but are to be switched between system applications and the gaming application such that each will have a focus of the device. The application manager preferably controls the switching of input stream, without knowledge the gaming application's knowledge and a driver maintains state information regarding focus switches. The cameras 27, 28 and capture device 20 may define additional input devices for the console 100.

In the embodiments disclosed herein, some or all of the described operations may be performed using one or more of the functional components described above. For example, some CPUs are powerful enough now to perform GPU-like processing of vertices and pixels. Thus the disclosed embodiments may be implemented in cases without a separate GPU.

Textures

The following example embodiments describe a texture identification and real-time shader modification method for texture fetch instrumentation in the context of video game applications and systems such as Microsoft's XBOX 360 console. However, the application to video game consoles is exemplary, and those skilled in the art will recognize that the disclosed principles are readily applicable to other real-time 3D data, applications and platforms. Such data may include any media file such as music files. Furthermore, the presently disclosed subject matter is applicable not only to textures, but to any situation where a library is attempting to track information (lifetime, usage patterns, uniqueness) of objects which it does not own, but which are passed into the library by other code not controlled or directly instrumentable by the library. All such data, applications and platforms are contemplated as within the scope of the present disclosure.

In the following examples, the disclosed methods are illustrated in the context of a software development kit used by a video game developer. However, the examples are provided for the purpose of illustration and the disclosed methods may be provided in using other methods and mechanisms.

In graphics applications such as video games, 3D graphics may be used. 3D graphics uses modeling via the wireframe representation of three-dimensional objects that may be displayed as a two-dimensional image using various 3D rendering techniques. Such techniques may, for example, represent a 3D object using a collection of points in 3D space connected by a geometric entity such as a triangle. When a scene in a video game application is set up, the various virtual objects, the viewer's perspective, color, and lighting may be considered in generating a still image or an animation. Typically, the 3D model's vertices are colored and that color may then be interpolated across the model's surface during rendering. One method of adding color information to a 3D model is by applying a 2D texture image to the model's surface using texture mapping. Textures may add detail, surface texture, or color to a computer-generated graphic or 3D model. Vertex geometry information (vertex buffers) may comprise texture coordinates that indicate how to map the points of the texture image map to the 3D model's surface. The texture may be mapped to the surface of a shape such as a triangle that is typically used in 3D modeling. Additionally, shaders may perform complex calculations to fetch from arbitrary locations within any number of textures. The foregoing example is only exemplary and only covers basic diffuse mapping. Video game applications now frequently use highly complex calculations to compute which portions of a texture to fetch. The present disclosure may be applied to cover all such texture usage scenarios.

Since a textured surface may be at an arbitrary distance and orientation relative to the viewer, some form of filtering may be applied to determine the best color for the pixel. Given a rectangular texture, depending on the desired viewing distance and orientation, multiple texels may need to be sampled and combined, to provide the most appropriate color for a pixel.

Mipmapping is one technique that may be used to save some of the processing required to map the texture data. Mipmaps may be pre-calculated optimized collections of images that accompany a main texture. The mipmaps may thus be used to increase rendering speed by alleviating the need to resize a texture in real time. Mipmapping prefilters the texture and stores the texture in smaller sizes down to a single pixel. As the textured surface moves farther away, the texture being applied switches to the prefiltered smaller size. Each mipmap image may be a version of the main texture, but at a certain reduced level of detail. Although the main texture may be used when the view is sufficient to render it in full detail, the renderer may switch to a suitable mipmap image when the texture is viewed from a distance or at a small size. Rendering speed increases since the number of texture pixels being processed can be much lower than with simple textures. For example, if the texture has a basic size of 256 by 256 pixels, then the associated mipmap set may contain a series of eight images, each one-fourth the total area of the previous one: 128×128 pixels, 64×64, 32×32, 16×16, 8×8, 4×4, 2×2, and 1×1.

Figure 3:
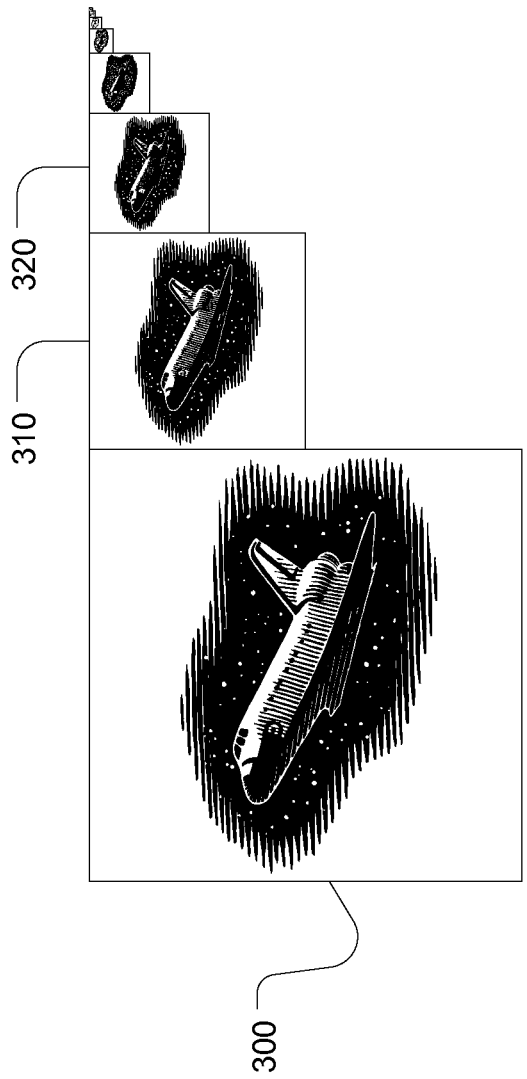
FIG. 3 illustrates an example of an image and filtered MIP levels.

Referring to FIG. 3, illustrated is an example of a texture mipmap image with a plurality of MIP levels. As shown in the figure, the principal image 300 on the left is accompanied by filtered copies of reduced size 310, 320, and so on.

3D applications typically require a significant amount of texture data to produce good quality scenes. The amount of texture data in turn requires a significant amount of space in memory and on the storage medium (e.g., hard disk or optical disk). In some cases application developers such as video game developers may have problems with having sufficient space on the disk for the desired image data. For example, each figure for every scene in a videogame may have multiple textures associated with it. A texture may be 128×128 pixels and may require several kilobytes per texture. To exacerbate the problem, a developer may inadvertently provide two or more textures of the same image. In other cases, a texture may be provided that is much larger than is needed for the application. It would be helpful to provide the data on the use of textures during development of the games that the developer can use to optimize the use of textures before shipping the product. For example, with such information a developer can eliminate duplicate textures, or reduce the dimensions of textures that are too large for their ultimate utilization in the application. Therefore, reducing the amount of graphics data such as texture data and optimizing the processing required to support the application is desirable for increasing the space available for other types of data, reducing download times, and fitting necessary data such as texture data onto a storage medium such as an optical disc. Reducing the amount of graphics data used for textures in a game or program would also allow for new textures used in new levels or new areas new or portions of the game to be added, expanding the game or program.

An important aspect of data optimization is understanding how many times an image file is used during the course of the execution of an application. For example, it would be advantageous to know how many times a certain MIP level of a texture is used during the course of a video game. In many cases an application such as a video game may ship with many examples of sub-optimal texture usage such as duplicate textures, textures that are never used, and MIP levels that are never fetched.

However, gathering detailed statistics regarding texture usage requires a significant amount of development investment and game modification. Typically, developers use simpler techniques such as visual inspection where textures are colored at run-time based on which MIP level is being displayed. Such techniques may, for example, provide information for identifying issues with the diffuse texture on a mesh. However, such techniques may not provide sufficient information in the case of textures where the color does not come through such as in a normal or gloss map. Furthermore, the use of visual inspection does not provide a holistic view of a texture's usage throughout the game, and tend to provide more qualitative rather than quantitative analysis. This visual inspection method is also not able to detect identical duplicates because visually they appear the same upon visual observation. The visual inspection method also is not well-suited for identifying which texture the developer is observing.

Some developers may implement offline processing of textures in their content pipelines that look for static issues such as duplicated color channels and similar textures. Such techniques can identify a certain class of issues, but do not provide useful information about how the texture is used at run-time. For example, such techniques cannot determine if a texture is never used during run-time, or if any channels were never fetched.

It is therefore desirable to uniquely identify textures as they are loaded and passed to the host system via, for example, the application programming interface (API). Typically such identification is difficult to perform on platforms that provide the application flexibility for creating and manipulating textures. For example, the system would need to deal with textures that have been deleted, relocated, aliased (i.e., have multiple texture headers that point to the same memory location), and the like. In addition, the system must be able to detect if a texture being loaded has been used before. One issue that such an identification needs to address is that when a texture is requested by reference to its address, the shader may identify the correct size of the texture (e.g., that it is a 64×64 texture) but it may not be known where from the disk that the texture was loaded from. Another issue is that textures loaded in a particular area of memory may later be moved, if allowed to by the library.

In various embodiments, a game developer may load the game application using the software development kit, click a button to enable data capture, and then run through the game at its various levels and scenes. Thereafter, the developer may view a report detailing the usage of the textures and the MIP levels that were used during the execution of the game.

Identification

In an embodiment of the presently disclosed subject matter, a modified 3D API library and a viewer application may be provided. The modified library may provide the same interfaces as the standard version of the library, but with several under-the-hood modifications to enable texture tracking The user/developer may compile their game application against the modified library and call a specific API to enable the tracking of textures. As the game executes, the library may uniquely identify all the textures used by the game. The library may also instrument shaders and command buffers on the fly such that texture usage statistics can be collected. In an embodiment, when the user desires to take a capture (i.e., a recording of texture usage patterns), the user may click a button on the viewer application or call the "start" API, whereupon all texture usage may be recorded by the library and stored in a capture file. When the user ends the capture by clicking a button in the viewer app or calling the "stop" API, the capture file may be transferred to the host computing system and loaded into the viewer application. At this time the viewer application may process the texture usage data and generate a list of smart recommendations for improving the usage of space. In one embodiment the user may be presented with the entire list of textures used, each with thumbnails, usage statistics, and recommended modifications to save texture space. An interactive graph of fetches per MIP and screenshots may be provided in order to help the user better understand the context in which the texture was used.

In one embodiment, a library provided by the system or console for use by the application (i.e., the external code) may expose a set of one or more APIs to the external code which process the objects. In some systems such a library may be provided that can be called by the game application to access functions provided by the system for example for rendering images and animations on the user interface. In the case of Microsoft's XBOX 360 which uses Direct3D, such APIs may comprise "SetTexture" or "SetPixelShader" wherein a game application may pass a texture or shader object to the library in order for the texture or shader object to be used by the library.

In some systems such as Microsoft's XBOX 360, the application may be provided complete control over the loading of textures from the DVD into the memory. While such a capability may provide flexibility to the game developer to improve performance, the flexibility may make it more difficult for the system to track a texture's usage once loaded. For example, when loading a texture from the DVD into the console memory, a copy of the image may be loaded into a section of memory that is unknown to the library.

The system may implement a structure for tracking the possible locations of objects in memory, with descriptions of each object that has identified at each memory address. When, for example, Direct3D directs commands and textures to the Graphics Processing Unit (GPU), the texture's identification may be determined. When the external code calls any of the standard or optional APIs, the library may be notified that "there is an object at address X, which has this description, and is being used in this way." The library may then check the memory tracking structure to see if a matching object with the same description was recently identified at that memory address.

If no objects have been identified at the address, or if other objects have been loaded at that memory address which do not match the new object, a new node for the address may be added to the structure with the description of the object that was provided to the API. Any previous nodes for the address may be added to the history of the node.

If the most recent object identified at that memory address matches the description of the object being passed to the API, the node tracking for that address may be updated with a "most recently used" timestamp and a counter may be incremented.

In order to deal with cases such as aliasing (where two objects with different descriptions share the same region of memory), a history of each memory address may be maintained that tracks the last N objects that have been loaded in that memory address. If an object's description does not match the "most recently used" in the address' history, but does match some other node in the history, then the old matching node may be moved to the "most recently used" position.

When a new object is discovered (e.g., whenever a new node is created in the above history), a new object analyzer may be invoked. Such an analyzer may be used to uniquely identify the object. In one embodiment an icon or thumbnail of the texture referenced by the GPU may be captured and saved. The thumbnail or icon may then be associated with the time that the image was rendered and the memory location that was retrieved. Future texture fetches associated with the same memory location may be accumulated and provided in the usage report.

One problem that may arise is when the developer may provide a name to identify a texture and then use the name again for a different texture or similar texture. For example, there may be a "brick" texture file for Level 1 of a game that represents a rectangular red brick. For Level 2 of a game, there may be a "brick" texture that represents a rounded gray stone used as a brick. In this case it would be useful to find another way to distinguish the textures even if they are given the same name by the developer. Another problem that may arise is when two identical textures are given different names. Similarly, a texture may have been provided twice.

In one embodiment, a hash may be calculated for each texture that is fetched. For instance, the new object analyzer may generate a 128-bit hash of the RGBA bits of one or more mip levels of the texture. For more complex objects, other types of hashing or unique identification methods may be used. With a hash for each of the textures, the system may be able to determine when hashes are identical or when different MIP levels are associated with the same image.

Once the object has been assigned a unique identifier (the 128-bit hash or otherwise), a history of the usage of that object may be maintained. For example, a texture may be loaded at time 0:15 to address A, unloaded at 0:20, re-loaded at 0:30 to address B, loaded into a 2nd memory address (address C) at 0:40, unloaded from B at 0:50 and from C at 0:53. For each of the times that the texture is loaded, the external code may be allowed to load the texture at any memory location (A, B, or C). By using the unique identifier, the creation/deletion information for each of the three addresses can be combined into one useful history. The per-address object description node may point to the appropriate entry in the unique persistent object-tracking database.

If a texture is loaded but never used during the course of execution of the application, no data needs to be provided for that texture and the developer can assume that the texture was not used.

Additionally and optionally, the library may expose a set of APIs to assist the tracking of object creation and deletion. In one embodiment, a second set of APIs may be used to allow for hints to be provided to assist the texture tracking code. For example, such hints may provide information for establishing definitive timestamps for texture creation and deletion. On Microsoft's XBOX 360, for example, such hints may be helpful because game applications may be allowed to manage textures independently from the D3D library. In another embodiment, the external code may also name an object. For example, the actual file name or the full path-on-disk of the file from which the object was loaded may be used as a name. This name can be used to assist in uniquely identifying the object. In this case the developer may need to modify the game code to provide the file names.

Example situations where "hint" functions may be used by the tracking mechanism include:

1) When the external code physically relocates an object in memory. In this case the external code may call a "report moved object" API to inform the memory tracker function.

2) When the external code replaces an object with another object with a matching description but a different unique object ID, the external code may either call a "Set Object Name" API, a "Report New Object" API, or a "Report Deleted Object" API in order to provide information so that the tracking mechanism can distinguish the two objects.

3) The API may be called to inform the system that a texture has been deleted.

However, if the new object analyzer is sufficiently fast, in some cases it may be acceptable to re-hash or re-generate the unique ID for every object, in which case the external calls to the "hint APIs" may not be invoked.

Figure 4:
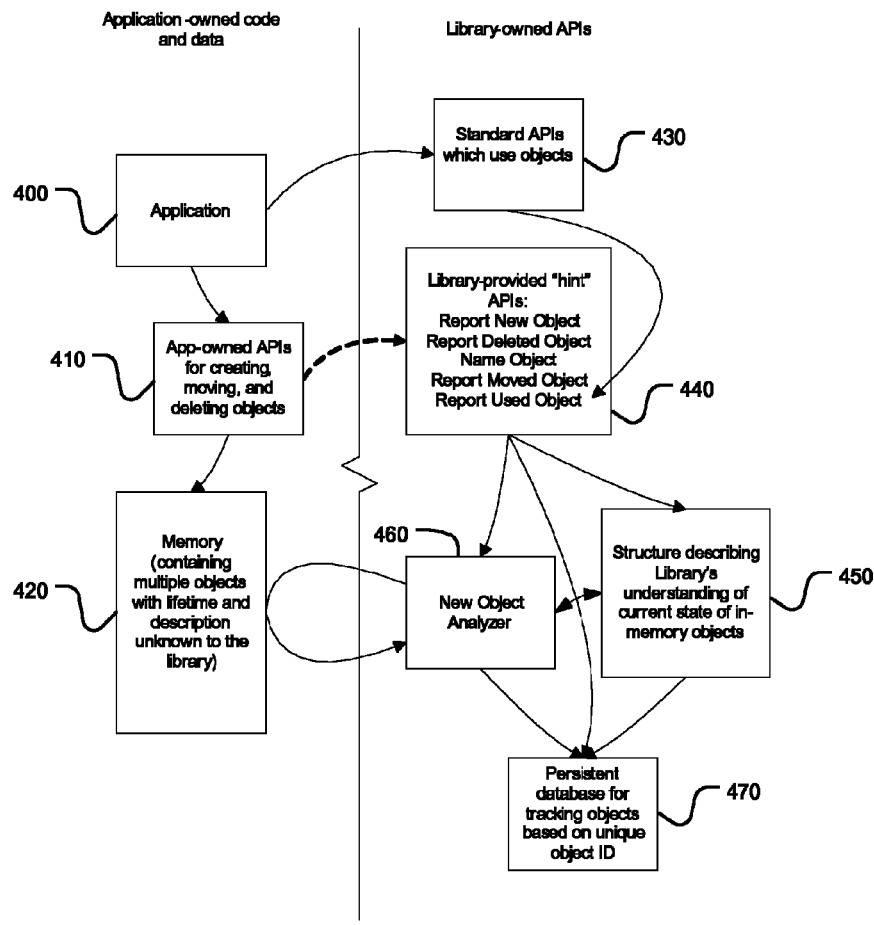
FIG. 4 depicts an exemplary system incorporating some of the embodiments disclosed herein.

Referring now to FIG. 4, illustrated is an exemplary functional diagram depicting various aspects of an identification system disclosed herein. The figure indicates one example including application-owned code and data and library-owned APIs. Application 400 may have access to application owned APIs 410. Such APIs may be called for creating objects, moving objects, deleting objects, and the like. As discussed above, in some systems the application may be provided control over the loading of objects into memory 420.

Thus memory 420 may contain multiple objects which may have lifetimes and descriptions that are unknown to the library.

The library may provide APIs 430 that can use and process the objects. The user/developer may compile their game application against the library and call a specific API to enable the tracking of textures. One or more APIs maybe called by application 400 to process the objects.

A structure 440 may be created and stored to describe the library's information regarding the current state of objects that are loaded in memory. New nodes may be added to the structure with the description of the object that was provided to the API when a new address is identified as having an object for processing or if objects have be loaded at that memory address which do not match the new object. Any previous nodes for the address may be added to the history of the node. If the most recent object identified at that memory address matches the description of the object being passed to the API, the node tracking for that address may be updated with a "most recently used" timestamp and a counter may be incremented.

When a new object is discovered, new object analyzer 460 may be invoked to uniquely identifying the object. All objects that have been created or otherwise used may be stored in persistent database 470. Additionally and optionally, a second set of APIs 440 may be used to allow for hints to be provided to assist the texture tracking code. For example, such hints may provide information for reporting new objects, reporting deleted objects, naming objects, reporting moved to objects, reporting used to objects, and the like.

Instrumentation and Data Capture

Shaders are typically used to program a GPU. A shader may comprise a set of software instructions for calculating rendering effects on the GPU. A shader may, for example, describe the characteristics of a vertex such as position, texture coordinates, and colors. A shader may also describe the characteristics of a pixel such as its position, texture coordinates, and colors. In an exemplary system, the central processing unit (CPU) may send instructions and geometry data to the GPU, and a vertex shader may transform the geometry, perform lighting calculations, perform changes to the geometries in a scene, triangulate the calculated geometry, and transform the triangle's pixel primitives.

In one embodiment, in order to determine how textures are used, a development system may track all shaders and textures used by an application. The tracking may be performed at the API level. In other embodiments, the tracking may be performed at other levels such as the driver level. Typically the instructions and data for the GPU are contained in packets that identify a texture as well as identifying the processing to be performed on that texture. For example, a packet may contain a point to a text and an instruction for the GPU to draw a texture one hundred times.

The packets may be interpreted and analyzed to determine the nature and content of what is being requested. Sufficient knowledge of how the packet will be used is necessary to do this interpretation and analysis. In one embodiment, the development system may parse the command buffer which is submitted to the GPU, and analyze and/or modify each packet. Commands may be added to track what textures and MIPs are being used. For example, the command packets may contain shader instructions and pointers to textures. A pixel shader may be disassembled to find all instructions which fetch from textures, and instructions may be added that determine the identity and MIP levels of each texture that is to be retrieved. After instrumenting the shader, the new shader may be added to a shader cache or other mechanism, in order to enable the original game's shader to point to the instrumented copy. The collected information (such as texture identity and mip level) may then be sent to the CPU so that the information can be tracked. In one embodiment a counter can be used to track how many times a texture is used.

In this fashion, whenever shaders are newly loaded or newly created they may be modified to track information related to the associated texture such as its identity or location. The modifications to the shaders, or of command buffer instructions may be called "instrumentation" and the terms may be used interchangeably herein.

Figure 5:
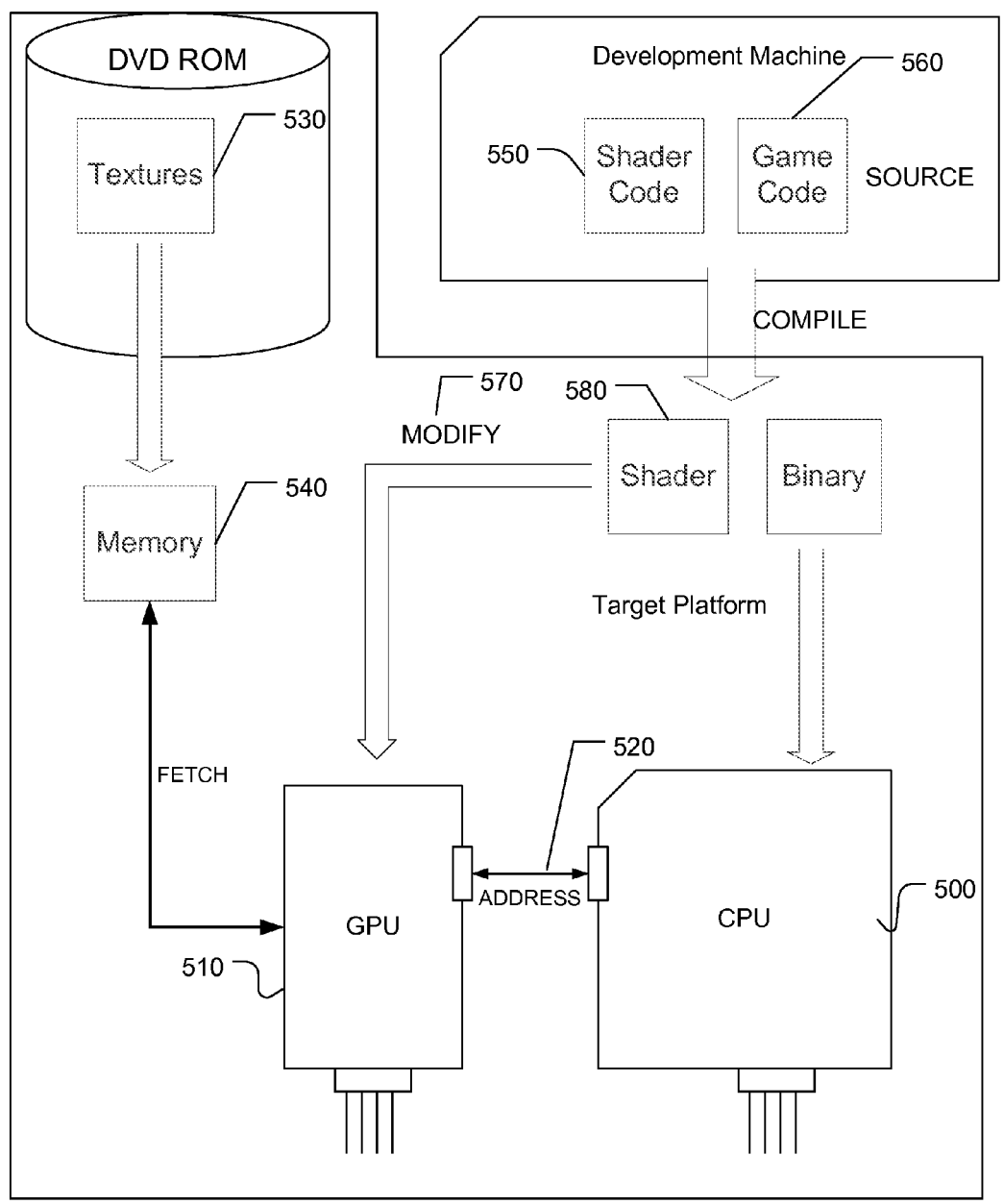
FIG. 5 depicts an exemplary system incorporating some of the embodiments disclosed herein.

In an exemplary system depicted in FIG. 5, the CPU 500 may send instructions and geometry data to the GPU 510. Textures 530 may be loaded into memory 540 from, for example, a DVD that includes a video game application. The application may include shader code 550 and game code 560 that has been compiled into executables. Shader instructions 580 may be modified or instrumented 570 prior to being executed by GPU 510.

Figure 6:
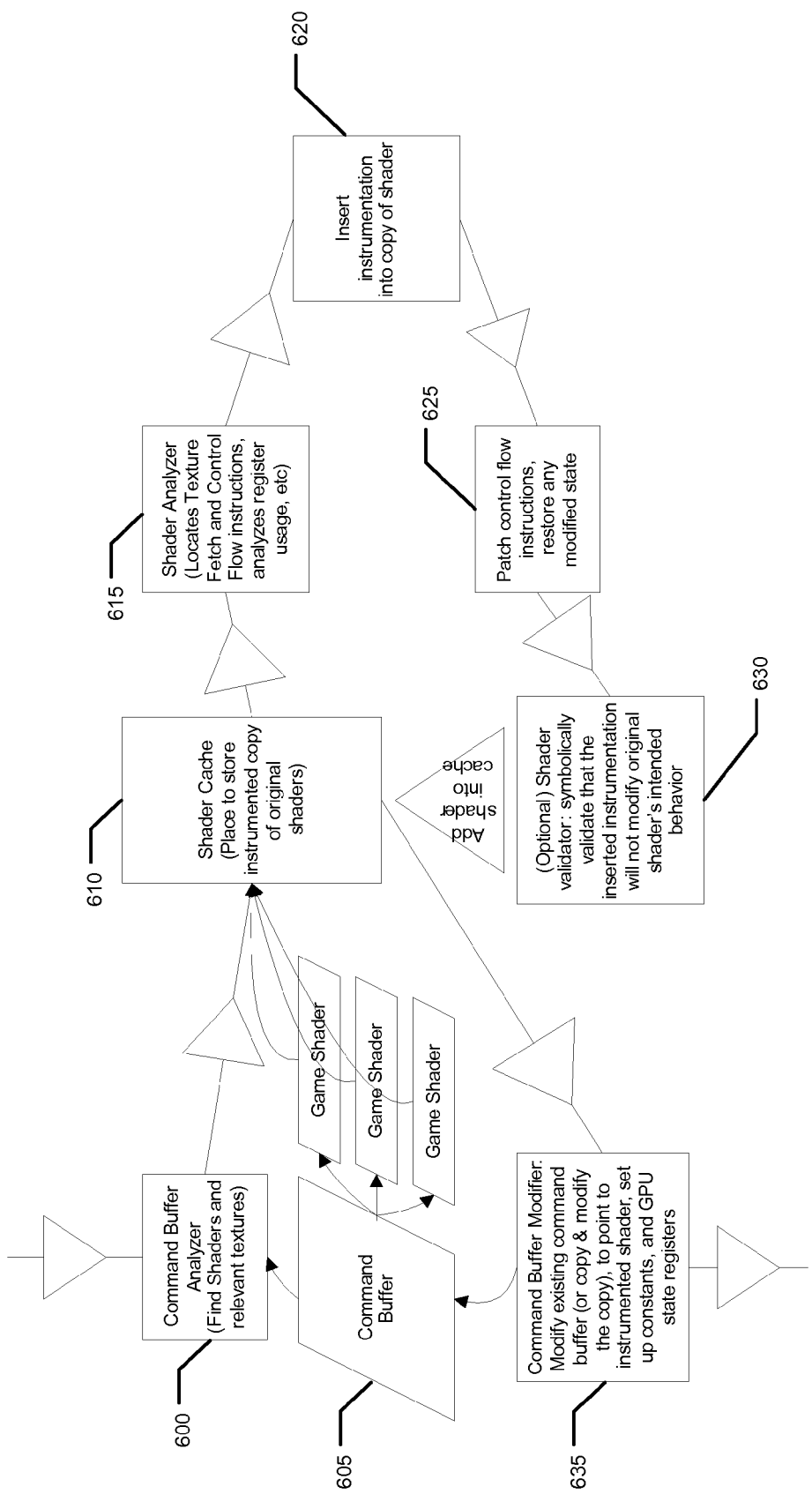
FIG. 6 depicts an exemplary process incorporating some of the embodiments disclosed herein.

FIG. 6 depicts an exemplary process for instrumenting shaders to track texture usage information. The development system may parse the command buffer 605 which is submitted to the GPU and analyze and/or modify each packet 600. Commands may be added to track what textures and MIPs are being used. After instrumenting the shader, the new shader may be added to the shader cache 610 or other mechanism in order to enable the original game's shader to point to the instrumented copy.

In order to prevent a shader from being re-instrumented multiple times, a cache system may be added. In one embodiment, a hash table of all previously-instrumented shaders may be maintained. In other embodiments, simpler methods may be used depending on the particular platform and scenario. For example, in a Windows Direct3D implementation, Direct3D completely owns the shader interfaces. In this case, flags may be added to the shader object indicating whether the object has been previously instrumented. If so, a pointer to the instrumented copy of the shader may be provided. Generally, some sort of caching mechanism may be used to improve performance.

A shader analyzer 615 may locate texture fetch and control flow instructions, analyze register usage, and the like. The instrumentation may then be inserted into a copy of the shader 620. Shaders that have not been previously instrumented may be analyzed in order to determine the appropriate texture fetch instructions and to determine the feasibility of instrumenting the shader. Adding instrumentation may involve, for example, allocating resources from the shader such as general purpose registers, input or constant registers, and extra shader instruction slots. If it is determined that there are insufficient resources available to add the instrumentation, then the shader may be flagged as not instrumentable.

In one embodiment, groups of similar texture fetch instructions may be identified that may be executed together. Such groups may, for example, not be separated by control flow branches. Instrumentation may then be inserted for the group rather than each instruction individually.

The nature of the instrumentation can vary depending on the hardware platform. For example, in an embodiment using Microsoft's XBOX 360 console, performance counters may be conditionally incremented from within the shader. In another embodiment, a byte may be conditionally exported to memory indicating that certain mipmap levels have been read.

For the purpose of identifying which mipmap levels are being read, instructions may be added that calculate the MIP that each texture fetch will retrieve. However, if a given texture has only one MIP level or if for any other reason the shader is being instrumented just for the purpose of determining which textures have been read (rather than for mipmap usage), the mipmap level calculation may be skipped.

Additionally and optionally, instructions may be inserted that save and restore 625 any states modified by the instrumentation code so that the original intended calculations of the shader are not altered.

For debugging purposes, the instrumented shader may be validated 630 to ensure that the added instrumentation does not affect the color/depth or any other calculations. Validation may be performed symbolically or through simulation.

In various embodiments described herein, one approach may be to anticipate the shader instruction that is about to be processed and instrument the instruction to include code to capture usage statistics. The embodiments are illustrative and one skilled in the art will recognize that the particular ordering of the described steps may be modified. For example, the modified instructions can be processed before or after the texture is retrieved. Those skilled in the art will also recognize that the disclosed methods may be applied to systems processing a variety of data in addition to textures and without prior knowledge of the data used by the application.

Once a shader has been instrumented, wherever the original shader is used, the system may load the instrumented version instead of the original. The command buffer may be modified 635 to point to the instrumented shader and set up constants and GPU state registers. In some cases, the system may also insert other commands into the command buffer to direct the results of the performance counters or memory to the desired location. In addition, other commands may be used to initialize and/or restore any registers allocated during the instrumentation process (general purpose registers, constants, interpolants, etc.).

When the process is completed a final report may be provided that indicates the amount of use of particular textures over time. For example, for each identified texture, a timeline may be provided that indicates when the texture was used. Such information may be useful to determine whether, for example, a particular textures was never used (that is, never displayed during the captured sequence), or used so infrequently that the developer may consider modifying the application to eliminate the texture altogether. In one embodiment the images or textures may be searched for after executing the application to determine which textures were actually called for a given piece of usage data. In another embodiment, the system may provide prioritized recommendations for saving texture space based on usage at run-time.

Figure 7:
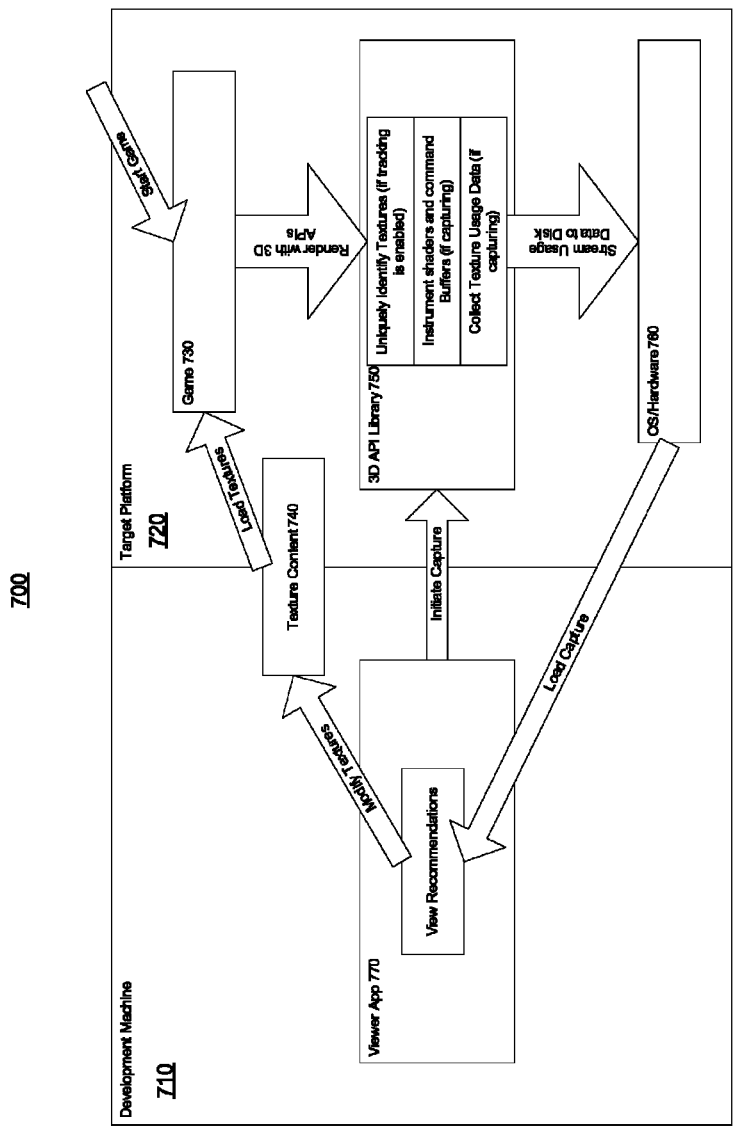
FIG. 7 depicts an exemplary process incorporating some of the embodiments disclosed herein.

Turning to FIG. 7, illustrated is an exemplary system 700 for tracking usage data for textures and other data assets. System 700 may comprise a development machine 710 and target platform 720. Game application 730 may be loaded and launched on the target platform. Texture content 740 may be loaded into the system memory. The texture content 740 may be rendered with 3D APIs that are exposed by the API Library 750. Various textures may be fetched and used to render graphics during execution of game application 730.

Viewer application 770 on the development machine 710 may provide additional interfaces for the developer to select options such as enabling and initiating a data capture. 3D API Library 750 may perform tasks such as uniquely identifying textures if the texture tracking feature is enabled. 3D API Library 750 may also instrument the shaders and command buffers and collect texture usage data if capturing is enabled. The usage data may be streamed to the appropriate target such as the operating system (OS) and/or system hardware such as a hard drive.

When execution of the game application 730 is complete or when the developer terminates data capture, the usage data captured and collected by the OS 760 may be provided to the viewer application 770 and may be displayed by a view recommendations feature 780 on the viewer application 770. Depending on the particular embodiment, the developer may generate and/or print various reports detailing the usage of the texture content 740. Based on the usage data, the developer may modify the texture content 740 and execute game application 730 on target platform 720 to further refine and optimize the texture content 740. This process may be repeated iteratively until the developer is satisfied with the texture content 740 and finalize the content for production delivery.

In one embodiment, the iterations may be simulated automatically so that the developer can quickly preview the results of the changes. Additionally and optionally, a file may be output that is fed into the content generation pipeline to perform the modifications automatically.

Thus in various embodiments the shader code can be modified in real-time to collect usage data for textures and other data assets. This application is useful not only for textures but in any application where a system that provides control over data assets is not informed about the creation or deletion of the assets or has limited information. By generating a unique identification such as a hash, detailed usage information can be collected about the use of those assets.

Figure 8A:
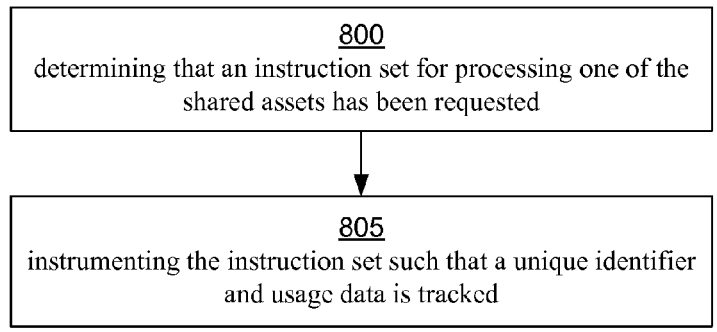
FIGS. 8A and 8B depict exemplary processes incorporating some of the embodiments disclosed herein.

Referring now to FIG. 8A, illustrated is an exemplary process for tracking utilization of shared assets in a system for rendering graphics using the shared assets. One or more of the illustrated operations may be omitted, and the illustrated operations do not imply a particular order. In one exemplary method, process 800 illustrates during execution of the rendering subsystem, determining that an instruction set for processing one of the shared assets by the rendering subsystem has been requested. Process 805 illustrates instrumenting the instruction set such that a unique identifier and usage data for said one of the shared assets is tracked by the system. In one embodiment, instrumenting may further comprise adding instruction sets that calculate a MIP that each texture fetch will retrieve. In another embodiment, data indicating which mipmap levels have been read may be stored. For example, a counter may be used to track a number of times the shared asset is used. Additionally and optionally, a counter may be used to track a number of times a specific region of a texture is fetched.

In some embodiments, a flag may be associated with each shader indicating whether the shader has been previously instrumented. Additionally, instrumenting may further comprise providing a pointer to a previously instrumented shader when the flag indicates that the shader object has been previously instrumented. In one embodiment, instrumenting may further comprise analyzing the instruction set to determine a feasibility of instrumenting the instruction set and flagging the instruction set as not instrumentable when the instruction set cannot be instrumented.

In another embodiment, similar asset fetching instruction sets may be grouped, and groups of the similar asset fetching instructions may be instrumented.

Figure 8B:
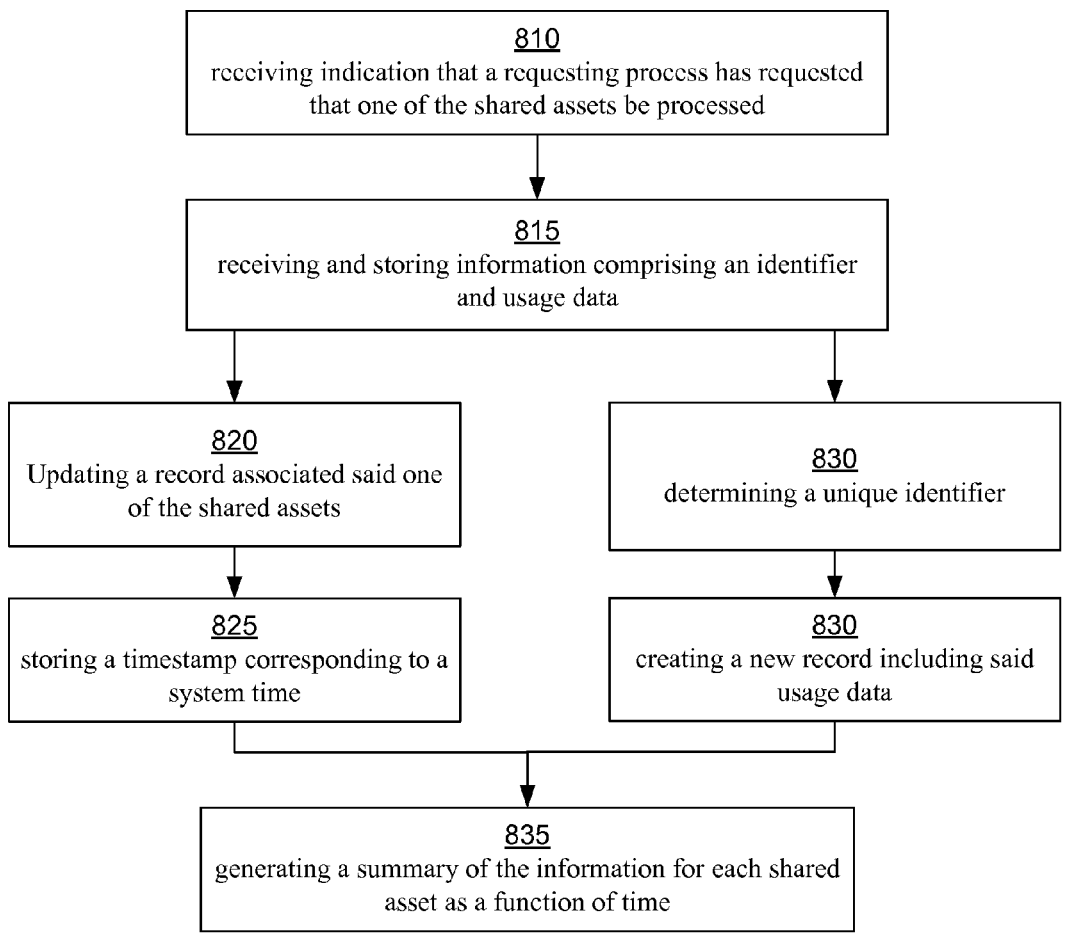

Referring now to FIG. 8B, illustrated is an exemplary process for tracking and reporting utilization of shared assets in a system for rendering graphics using the shared assets. One or more of the illustrated operations may be omitted, and the illustrated operations do not imply a particular order. In one exemplary method, process 810 illustrates receiving indication that a requesting process has requested that one of the shared assets be processed by the rendering subsystem. Process 815 illustrates receiving and storing information comprising an identifier and usage data for said one of the shared assets. In an embodiment, a record associated said one of the shared assets may be updated 820 and a timestamp corresponding to a system time may be stored 825 when a matching asset is identified. In another embodiment, a unique identifier may be determined 830 for said one of the shared assets and a new record including said usage data may be created 830. Operation 835 illustrates generating a summary of the information for each shared asset as a function of time.

In one embodiment, a record may comprise a history of a memory address associated with the identifier including a predetermined number of assets that have been loaded at the memory address. As discussed above, the identifier may comprise a thumbnail of the shared asset. In another embodiment, the identifier ay comprise a hash of the shared asset.

Figure 9:
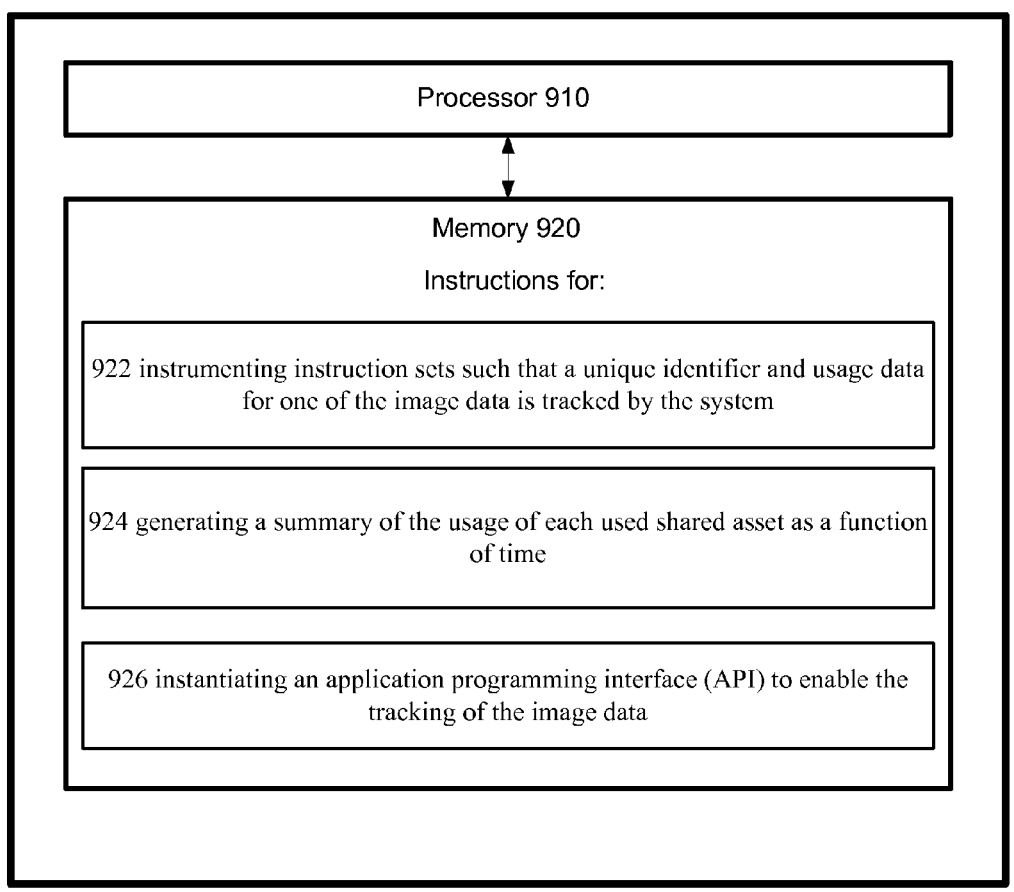
FIG. 9 depicts example system for providing a shared media experience.

FIG. 9 depicts an exemplary system for tracking and reporting utilization of image data in a system for rendering graphics using the image data. Referring to FIG. 9, system 900 comprises a process 910 and memory 920. Memory 920 further comprises computer instructions for tracking and reporting utilization of image data in a system for rendering graphics using the image data.

Block 922 illustrates instrumenting instruction sets such that a unique identifier and usage data for one of the image data is tracked by the system. Block 924 illustrates generating a summary of the usage of each used shared asset as a function of time. In one embodiment, an application programming interface (API) may be provided to enable the tracking of the image data 926. In various embodiments, the API may includes an interface for starting a capture process and an interface for stopping the capture process. When the capture process is stopped, capture files may be loaded to a viewer application. In further embodiments, an interactive graph of fetches per MIP may be generated. Additionally, texture usage data may be processed and a list of recommendations for improving usage of storage space for the image data may be generated.

It should be understood that the various techniques described herein may be implemented in connection with hardware or software or, where appropriate, with a combination of both. Thus, the methods and apparatus of the disclosure, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the disclosure. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the disclosure, e.g., through the use of an application programming interface (API), reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

While the invention has been particularly shown and described with reference to a preferred embodiment thereof, it will be understood by those skilled in the art that various changes in form and detail may be made without departing from the scope of the present invention as set forth in the following claims. Furthermore, although elements of the invention may be described or claimed in the singular, the plural is contemplated unless limitation to the singular is explicitly stated.

What is claimed:

1. A method for tracking utilization of graphics assets in a system for rendering graphics using the graphics assets, wherein the graphics assets are associated with a software program and loaded into a computer memory and processed by a rendering subsystem, the method comprising:

during execution of the software program, determining that an instruction set for processing one of the graphics assets by the rendering subsystem has been requested;

in response to said determining, instrumenting the instruction set such that a unique identifier is assigned to said one of the assets, said instrumenting comprising parsing the instruction set and adding one or more tracking commands operable to track identities of graphics assets that are being accessed;

tracking usage data for said one of the assets by the system during the execution of the rendering subsystem using the added tracking commands; and storing the tracked usage data for analysis of usage of the graphics assets by the software program after completion of said execution of the software program.

2. The method of claim 1 wherein the rendering subsystem comprises a graphics processing unit, the assets comprise textures, and the instruction set comprises a shader.

3. The method of claim 1 wherein a counter is used to track a number of times shared assets are used.

4. The method of claim 1 wherein a counter is used to track a number of times a specific region of a texture is fetched.

5. The method of claim 2, further comprising associating a flag with each shader indicating whether the shader has been previously instrumented, wherein said instrumenting further comprises providing a pointer to a previously instrumented shader when the flag indicates that the shader has been previously instrumented.

6. The method of claim 1 wherein said instrumenting further comprises analyzing the instruction set to determine a feasibility of instrumenting the instruction set and flagging the instruction set as not instrumentable when the instruction set cannot be instrumented.

7. The method of claim 1, further comprising grouping similar asset fetching instruction sets, wherein said instrumenting further comprises instrumenting groups of the similar asset fetching instructions.

8. The method of claim 1 wherein said tracked by the system further comprises storing data indicating which mipmap levels have been read.

9. The method of claim 2 wherein said instrumenting further comprises adding instruction sets that calculate a MIP that each texture fetch will retrieve.

10. The method of claim 2 wherein said instrumenting further comprises adding instruction sets that save and restore any states modified by the instrumenting.

11. A method for tracking and reporting utilization of graphics assets in a system for rendering graphics using the graphics assets, wherein the graphics assets are associated with a software program and loaded into a computer memory and processed by a rendering subsystem, the method comprising:

parsing graphics instructions and adding one or more tracking commands operable to track identities of graphics assets that are being accessed;

during execution of the software program, receiving indication that a requesting process has requested that one of the graphics assets be processed by the rendering subsystem using at least one of the parsed graphics instructions;

in response to receiving the indication, during processing of the one of the graphics assets by the rendering subsystem, receiving and storing information comprising an identifier and usage data for said one of the graphics assets, wherein a record associated said one of the graphics assets is updated and a timestamp corresponding to a system time is stored when a matching asset is identified, and otherwise determining a unique identifier for said one of the graphics assets and creating a new record, including said usage data, during the execution of the rendering subsystem; and after completion of the execution of the software program, generating a summary of the information for each graphics asset as a function of time.

12. The method of claim 11 wherein said record comprises a history of a memory address associated with the identifier including a predetermined number of assets that have been loaded at the memory address.

13. The method of claim 11 wherein said identifier comprises a thumbnail of the graphics asset.

14. The method of claim 11 wherein said identifier comprises a hash of the graphics asset.

15. A computing system configured to track and report utilization of image data in a system for rendering graphics using the image data, wherein the image data are associated with a software program and loaded into a computer memory and processed by a graphics processing unit, the computing system comprising at least one processor, a user interface device, and at least one memory communicatively coupled to said at least one processor, the at least one memory having stored therein computer-executable instructions that, when executed by said at least one processor, cause the computing system to:

during processing of the image data by the graphics processing unit, instrument instruction sets such that unique identifiers are assigned to the image data and usage data for the image data is tracked by the computing system during the processing of the image data by the graphics processing unit and stored for analysis of usage of the image data by the software program after completion of said execution of the software program, wherein the instruction sets are instrumented by parsing the instruction sets and adding one or more tracking commands operable to track identities of graphics assets that are being accessed; and generate a summary of the usage of the image data as a function of time.

16. The system of claim 15 wherein an application programming interface (API) is provided to enable the tracking of the image data.

17. The system of claim 16 wherein the API includes an interface for starting a capture process.

18. The system of claim 17 wherein the API includes an interface for stopping the capture process, further comprising computer-executable instructions that, when executed by said at least one processor, cause the system to, when an indication to stop capture is received, load capture files to a viewer application.

19. The system of claim 18, further comprising computer-executable instructions that, when executed by said at least one processor, cause the system to generate an interactive graph indicative of a number of fetches per MIP.

20. The system of claim 18, further comprising computer-executable instructions that, when executed by said at least one processor, cause the system to process texture usage data and generate a list of recommendations for improving usage of storage space for the image data.

* * * * *